(12) United States Patent
Hayden et al.

(10) Patent No.: US 12,042,866 B2
(45) Date of Patent: Jul. 23, 2024

(54) ADDITIVE MANUFACTURING APPARATUS AND FLUID FLOW MECHANISM

(71) Applicant: General Electric Company, Schenectady, NY (US)

(72) Inventors: Christopher James Hayden, Delanson, NY (US); Victor Petrovich Ostroverkhov, Ballston Lake, NY (US); William Thomas Carter, Jr., Galway, NY (US)

(73) Assignee: General Electric Company, Cincinnati, OH (US)

( * ) Notice: Subject to any disclaimer, the term of this patent is extended or adjusted under 35 U.S.C. 154(b) by 42 days.

(21) Appl. No.: 17/202,701

(22) Filed: Mar. 16, 2021

(65) Prior Publication Data

US 2022/0297194 A1 Sep. 22, 2022

(51) Int. Cl.
*B22F 12/70* (2021.01)
*B22F 10/28* (2021.01)
*B22F 12/37* (2021.01)
*B33Y 30/00* (2015.01)

(52) U.S. Cl.
CPC .............. *B22F 12/70* (2021.01); *B22F 10/28* (2021.01); *B22F 12/37* (2021.01); *B33Y 30/00* (2014.12)

(58) Field of Classification Search
CPC .......... B22F 12/70; B22F 12/37; B22F 10/28; B33Y 30/00; B29C 64/357
See application file for complete search history.

(56) References Cited

U.S. PATENT DOCUMENTS

| | | |
|---|---|---|
| 5,252,264 A | 10/1993 | Forderhase et al. |
| 6,798,814 B2 | 9/2004 | Geiger et al. |
| 7,229,586 B2 | 6/2007 | Dunlap et al. |
| 8,017,055 B2 | 9/2011 | Davidson et al. |

(Continued)

FOREIGN PATENT DOCUMENTS

| | | |
|---|---|---|
| CN | 204736450 U | 11/2015 |
| CN | 105413330 A | 3/2016 |

(Continued)

OTHER PUBLICATIONS

Egan, Spiral Growth Manufacture: A Continuous Additive Manufacturing Technology for Powder Processing, University of Liverpool, 2007, 294 Pages.

(Continued)

*Primary Examiner* — Farah Taufiq
(74) *Attorney, Agent, or Firm* — Dority & Manning, P.A.

(57) ABSTRACT

An additive manufacturing (AM) apparatus is provided, having a build unit including a powder delivery mechanism, a powder recoating mechanism, and an irradiation beam directing mechanism. The AM apparatus further includes a rotatable build platform having an inner diameter and an outer diameter. A fluid flow mechanism includes an inlet body forming an inlet plenum and a collector body extended from the inlet body. The collector body forms a collector plenum in fluid communication with the inlet plenum. The collector body forms an outlet opening, wherein the outlet opening is positioned proximate to the inner diameter of the rotatable build platform. The outlet opening is configured to provide a flow of fluid toward the outer diameter above the rotatable build platform.

20 Claims, 8 Drawing Sheets

(56) References Cited

U.S. PATENT DOCUMENTS

| | | |
|---|---|---|
| 8,172,562 B2 | 5/2012 | Mattes |
| 8,212,176 B2 | 7/2012 | Akiyama et al. |
| 8,866,040 B2 | 10/2014 | Ko et al. |
| 8,956,144 B2 | 2/2015 | Grasegger et al. |
| 9,073,264 B2 | 7/2015 | Abe et al. |
| 9,126,167 B2 | 9/2015 | Ljungblad |
| 9,188,341 B2 | 11/2015 | McMasters et al. |
| 9,321,215 B2 | 4/2016 | Dudley |
| 9,346,127 B2 | 5/2016 | Buller et al. |
| 9,358,729 B2 | 6/2016 | Hofacker et al. |
| 9,403,235 B2 | 8/2016 | Buller et al. |
| 9,527,272 B2 | 12/2016 | Steele |
| 9,597,730 B2 | 3/2017 | Mironets et al. |
| 9,765,972 B2 | 9/2017 | Zink |
| 10,195,693 B2 | 2/2019 | Buller et al. |
| 10,507,549 B2 | 12/2019 | Buller et al. |
| 2013/0112672 A1 | 5/2013 | Keremes et al. |
| 2014/0191439 A1 | 7/2014 | Davis |
| 2015/0102531 A1 | 4/2015 | El-Siblani et al. |
| 2015/0165556 A1 | 6/2015 | Jones et al. |
| 2015/0202687 A1 | 7/2015 | Pialot et al. |
| 2015/0246485 A1 | 9/2015 | Guenster et al. |
| 2015/0251360 A1 | 9/2015 | Steele |
| 2015/0273631 A1 | 10/2015 | Kenney et al. |
| 2016/0016361 A1 | 1/2016 | Lobovsky et al. |
| 2016/0031010 A1 | 2/2016 | O'Neill et al. |
| 2016/0067923 A1 | 3/2016 | James et al. |
| 2016/0114427 A1 | 4/2016 | Eibl et al. |
| 2016/0129502 A1 | 5/2016 | Varetti |
| 2016/0136730 A1 | 5/2016 | McMurtry et al. |
| 2016/0136731 A1 | 5/2016 | McMurtry et al. |
| 2016/0144563 A1 | 5/2016 | Elliott |
| 2016/0193695 A1 | 7/2016 | Haynes |
| 2016/0288207 A1 | 10/2016 | Gambardella |
| 2016/0318253 A1 | 11/2016 | Barnhart |
| 2016/0368050 A1 | 12/2016 | Morris et al. |
| 2017/0008127 A1 | 1/2017 | Hyatt et al. |
| 2017/0036404 A1 | 2/2017 | Rengers et al. |
| 2017/0120335 A1 | 5/2017 | DeMuth et al. |
| 2017/0225227 A1 | 8/2017 | Volk |
| 2017/0246678 A1 | 8/2017 | Bunker et al. |
| 2017/0246689 A1 | 8/2017 | Garry |
| 2017/0266876 A1 | 9/2017 | Hocker |
| 2017/0304894 A1 | 10/2017 | Buller et al. |
| 2017/0320267 A1 | 11/2017 | Lind et al. |
| 2018/0161925 A1 | 6/2018 | Harding et al. |
| 2018/0169970 A1 | 6/2018 | Harding et al. |
| 2018/0345600 A1 | 12/2018 | Brandon et al. |
| 2019/0224748 A1* | 7/2019 | Barnhart ............... B22F 12/30 |
| 2019/0240774 A1 | 8/2019 | Carter et al. |
| 2020/0122396 A1 | 4/2020 | Morganson et al. |
| 2021/0069967 A1* | 3/2021 | Morris ................ B22F 12/52 |
| 2022/0219402 A1* | 7/2022 | Neill .................. B22F 12/37 |

FOREIGN PATENT DOCUMENTS

| | | |
|---|---|---|
| CN | 103990799 B | 5/2016 |
| CN | 206718485 U | 12/2017 |
| DE | 102005014483 A1 | 10/2006 |
| EP | 1016494 A2 | 7/2000 |
| EP | 3117982 A1 | 1/2017 |
| EP | 3050666 B1 | 3/2018 |
| EP | 3643433 | 4/2020 |
| JP | H09267189 A | 10/1997 |
| KR | 20090030581 A | 3/2009 |
| WO | WO2014195068 A1 | 12/2014 |
| WO | WO2015191257 A1 | 12/2015 |
| WO | WO2019/149305 A1 | 8/2019 |
| WO | WO2019/152203 A1 | 8/2019 |
| WO | WO2019147378 A1 | 8/2019 |

OTHER PUBLICATIONS

Fernandes et al., Test for Measurement of Spattering Level and Reach in MIG/MAG Welding, Welding & Inspection, vol. 15, Issue 2, Apr.-Jun. 2010, pp. 150-155.

Fu et al., Microstructure and Mechanical Properties of Ti-6Al-4V Fabricated by Vertical Wire Feeding with Axisymmetric Multi-Laser Source, Applied Sciences, vol. 7, Issue 3; 227, Feb. 28, 2017, 11 Pages.

Guo et al., Design of a Novel Control Strategy for Laser-Aided Additive Manufacturing Processes, IECON 2016—$42^{nd}$ Annual Conference of the IEEE Industrial Electronics Society, Florence, Oct. 23-26, 2016, pp. 6091-6096.

Hauser et al., Spiral Growth Manufacturing (SGM)—a Continuous Additive Manufacturing Technology for Processing Metal Power by Selective Laser Melting, ResearchGate, Jan. 2005, pp. 1-12.

Ji et al., Fabrication of Functionally Graded Properties by Direct Laser Melting of Compositionally Selective Metallic Powder, 2015 International Conference on Control, Automation and Systems (ICCAS) Busan, Oct. 13-16, 2015, pp. 1955-1957.

Luo et al., Trajectory Generation and Planning for Simultaneous 3D Printing of Multiple Objects, 2017 IEEE $26^{th}$ International Symposium on Industrial Electronics (ISIE), Edinburgh, 2017, pp. 1147-1152.

Murr et al., 3D Metal Droplet Printing Development and Advanced Materials Additive Manufacturing, Journal of Materials Research and Technology, vol. 6, Issue 1, Jan.-Mar. 2017, pp. 77-89.

Pereira et al., Contributions for the Next Generation of 3D Metal Printing Machines, Proceedings SPIE 9353, Laser 3D Manufacturing II, San Francisco, Mar. 16, 2015, 11 Pages.

* cited by examiner

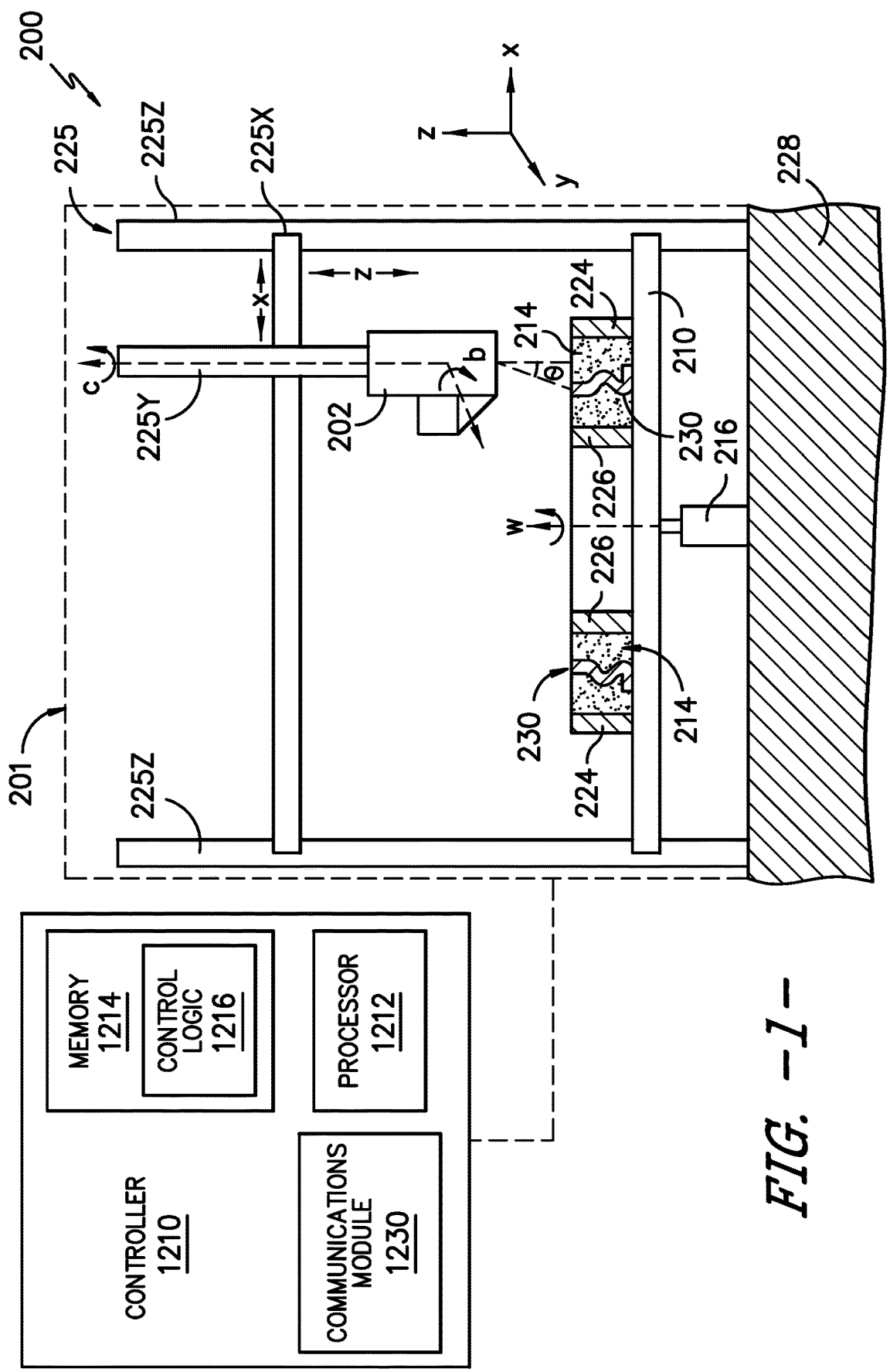
FIG. -1-

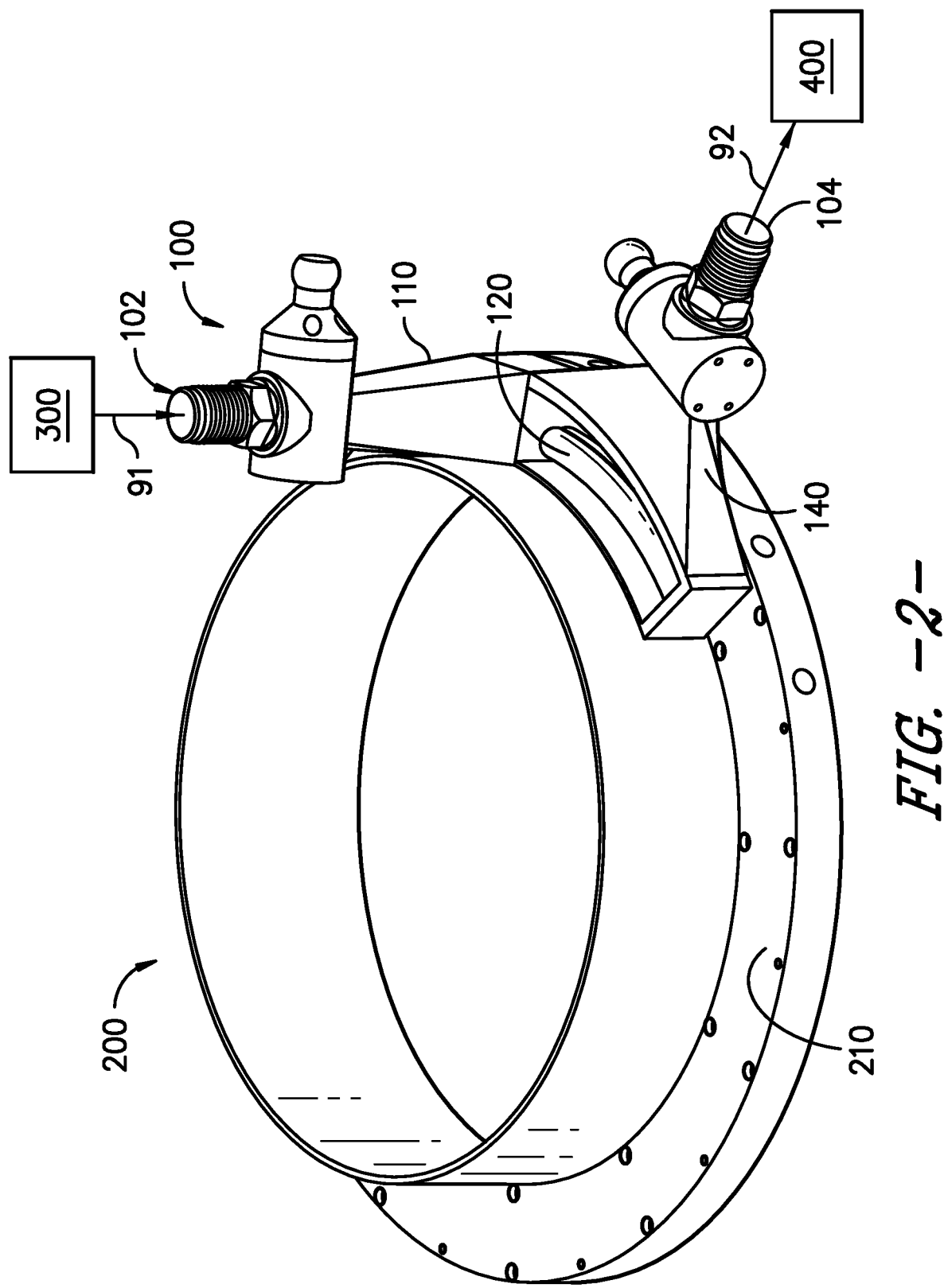
FIG. -2-

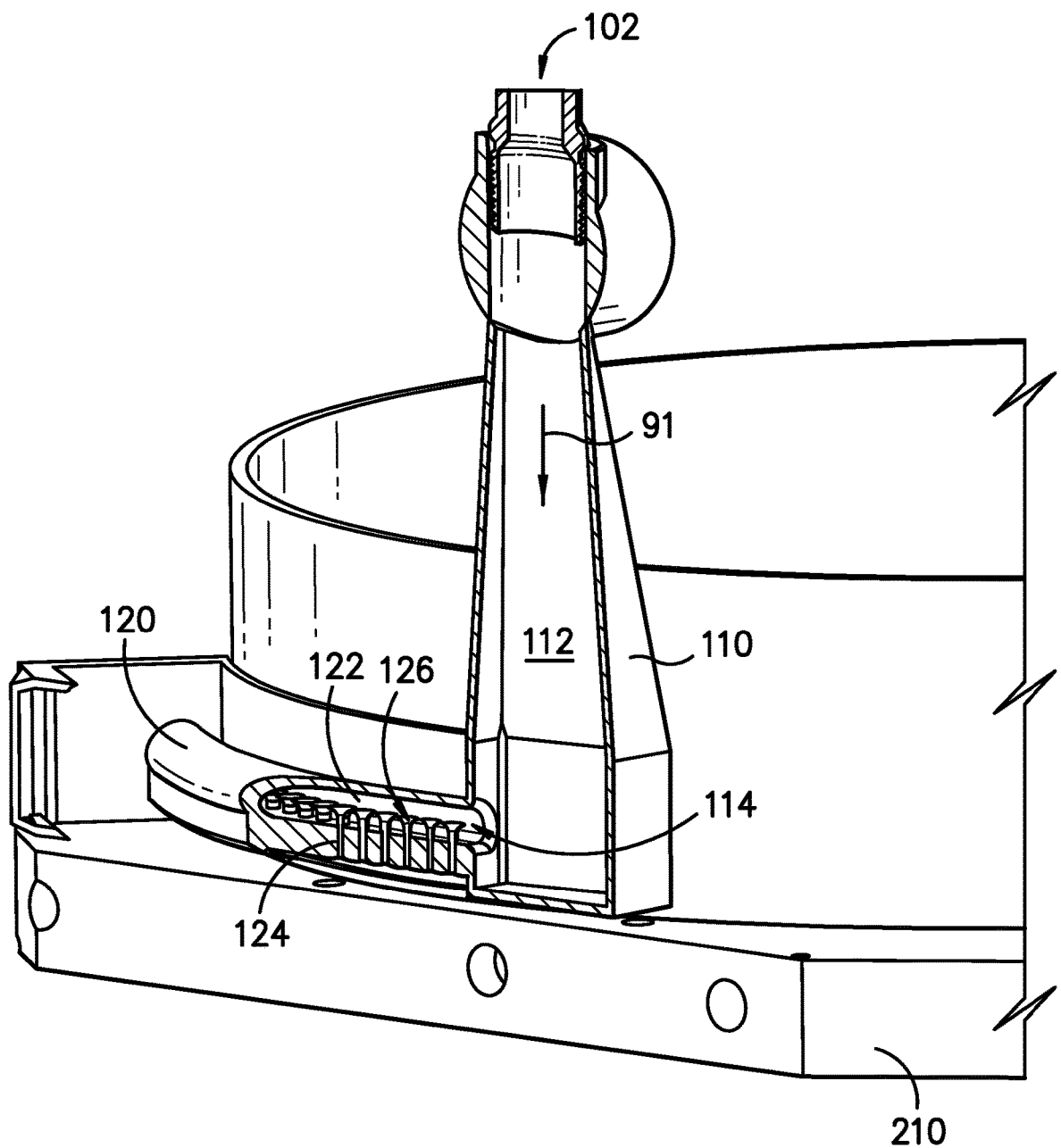
FIG. -3-

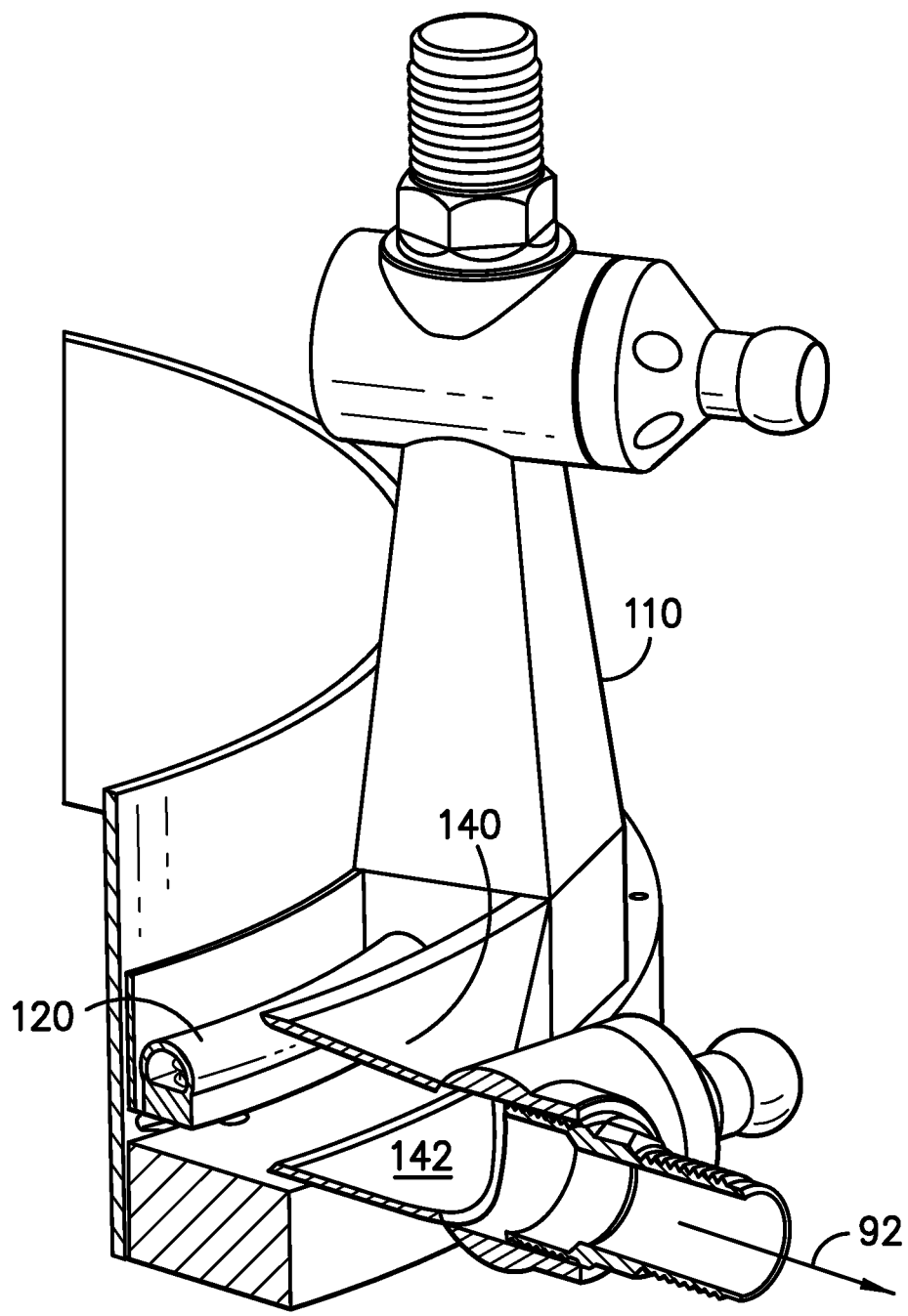
FIG. -4-

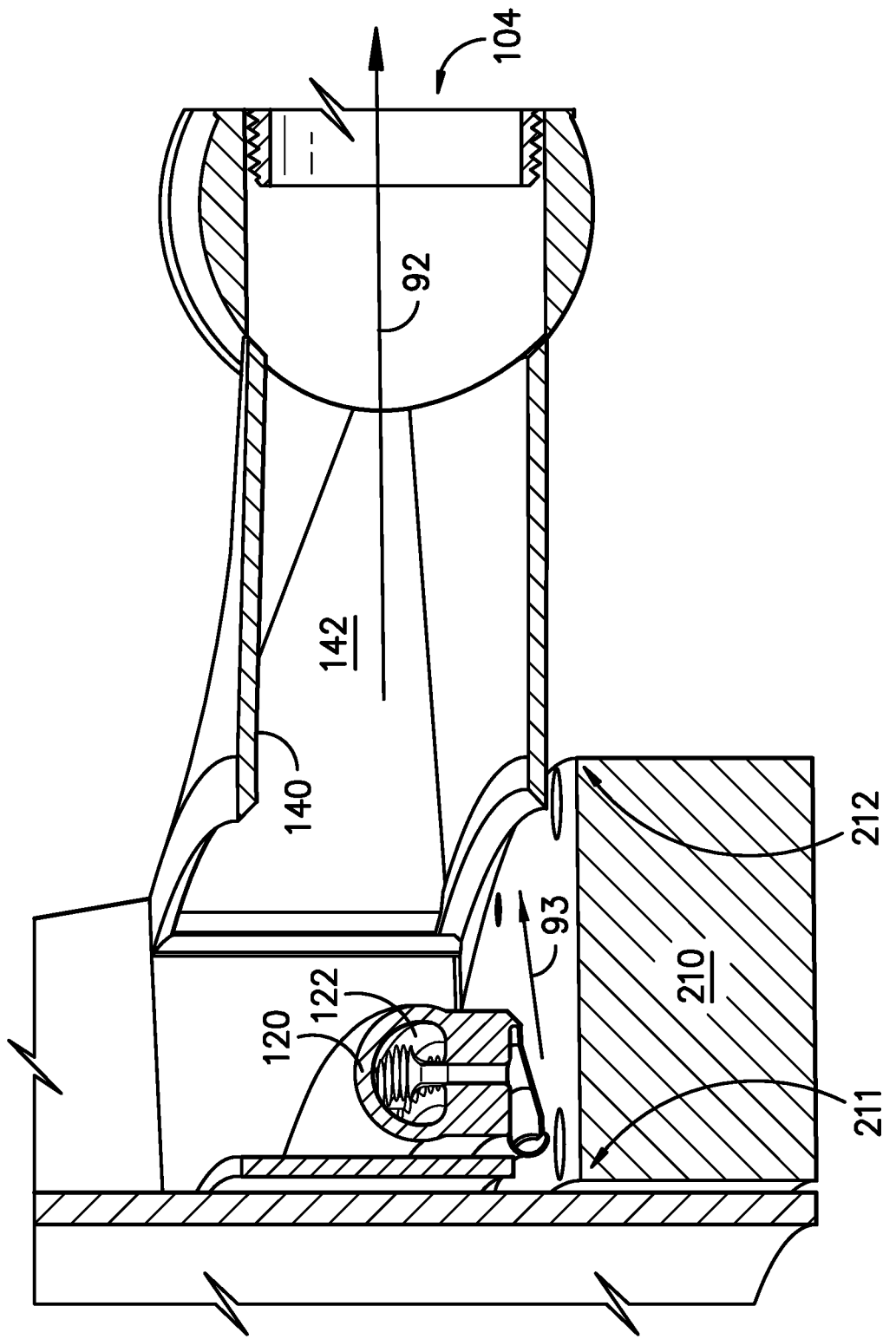
FIG. -5-

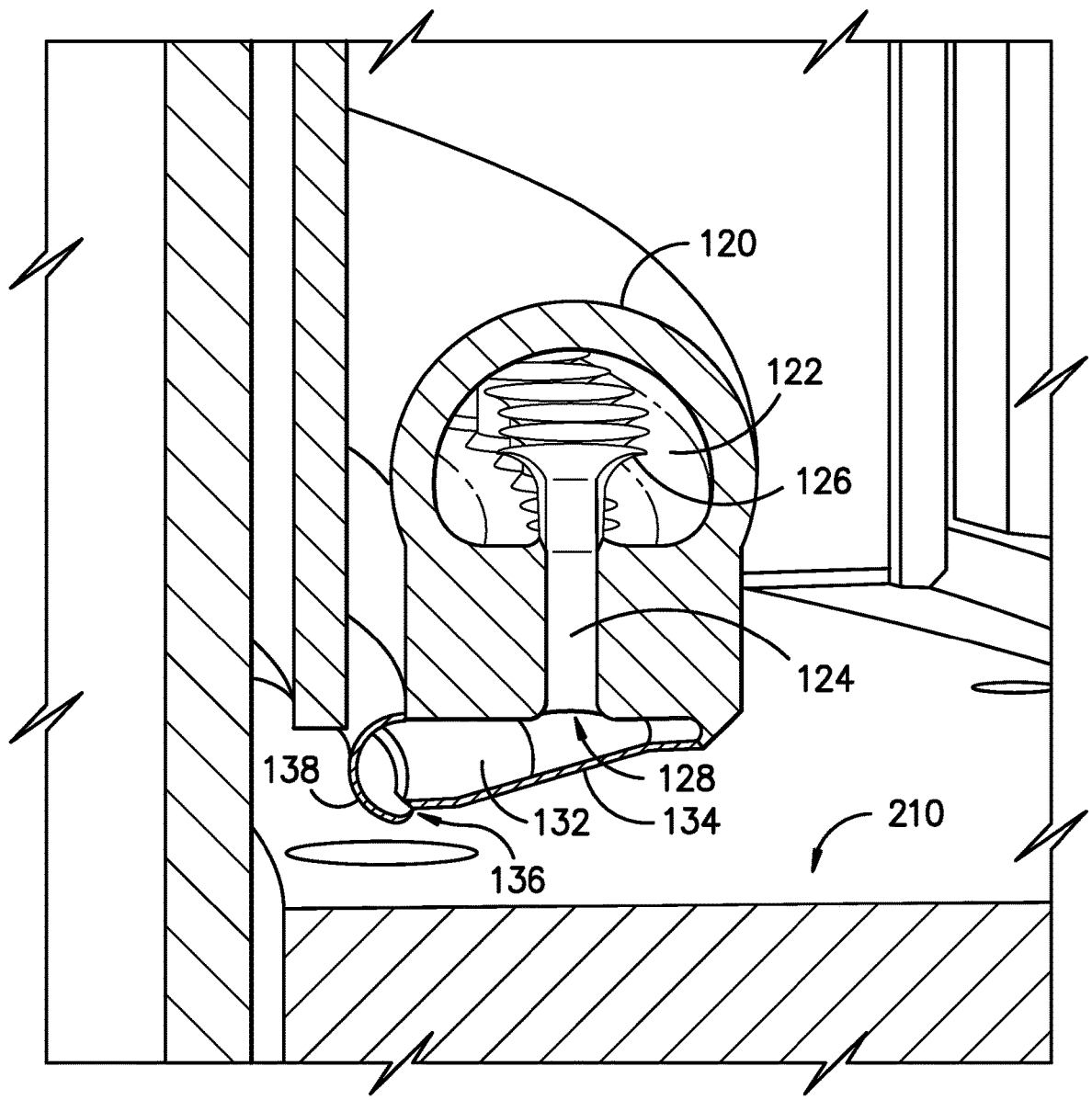
FIG. -6-

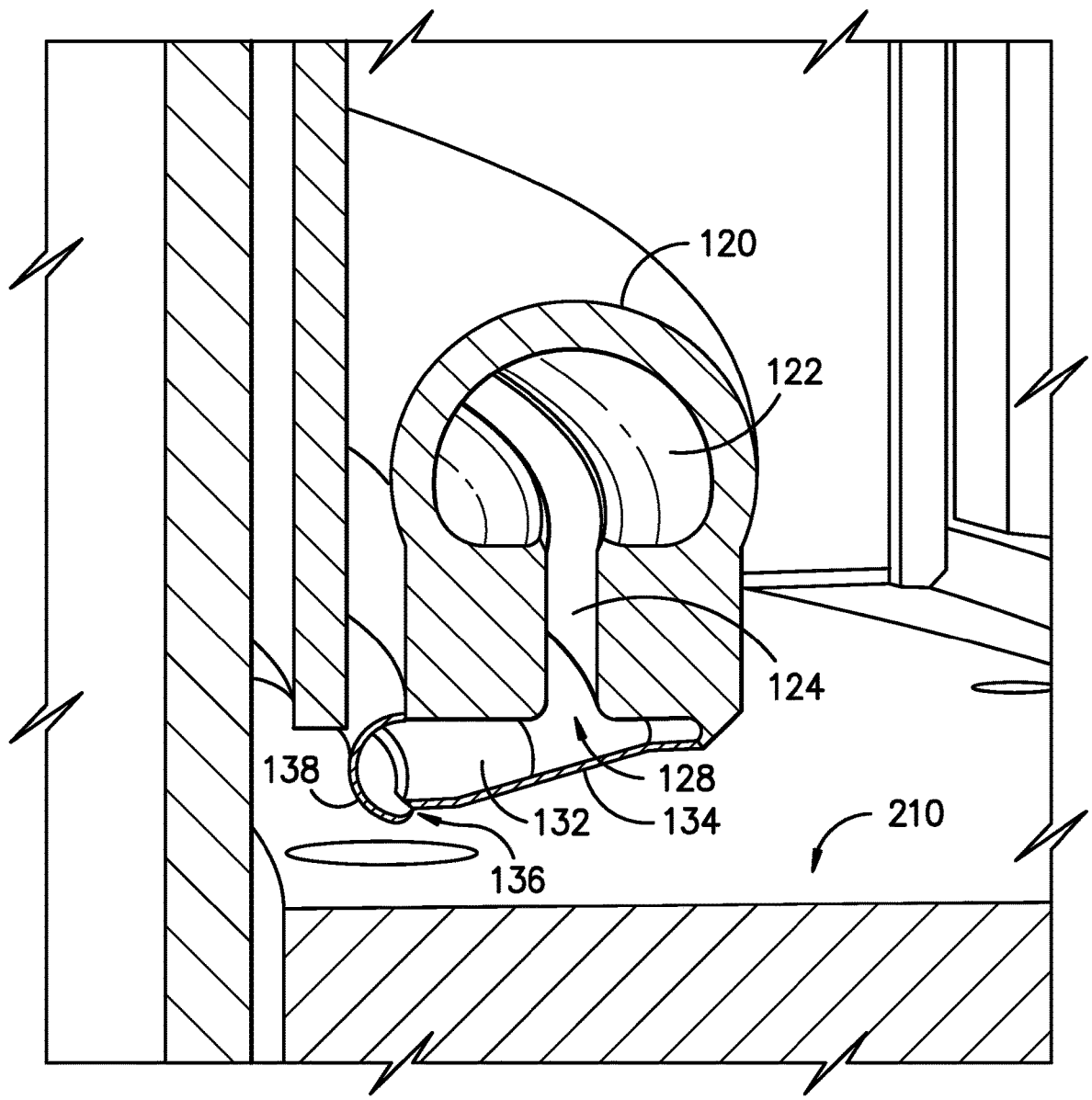
FIG. -7-

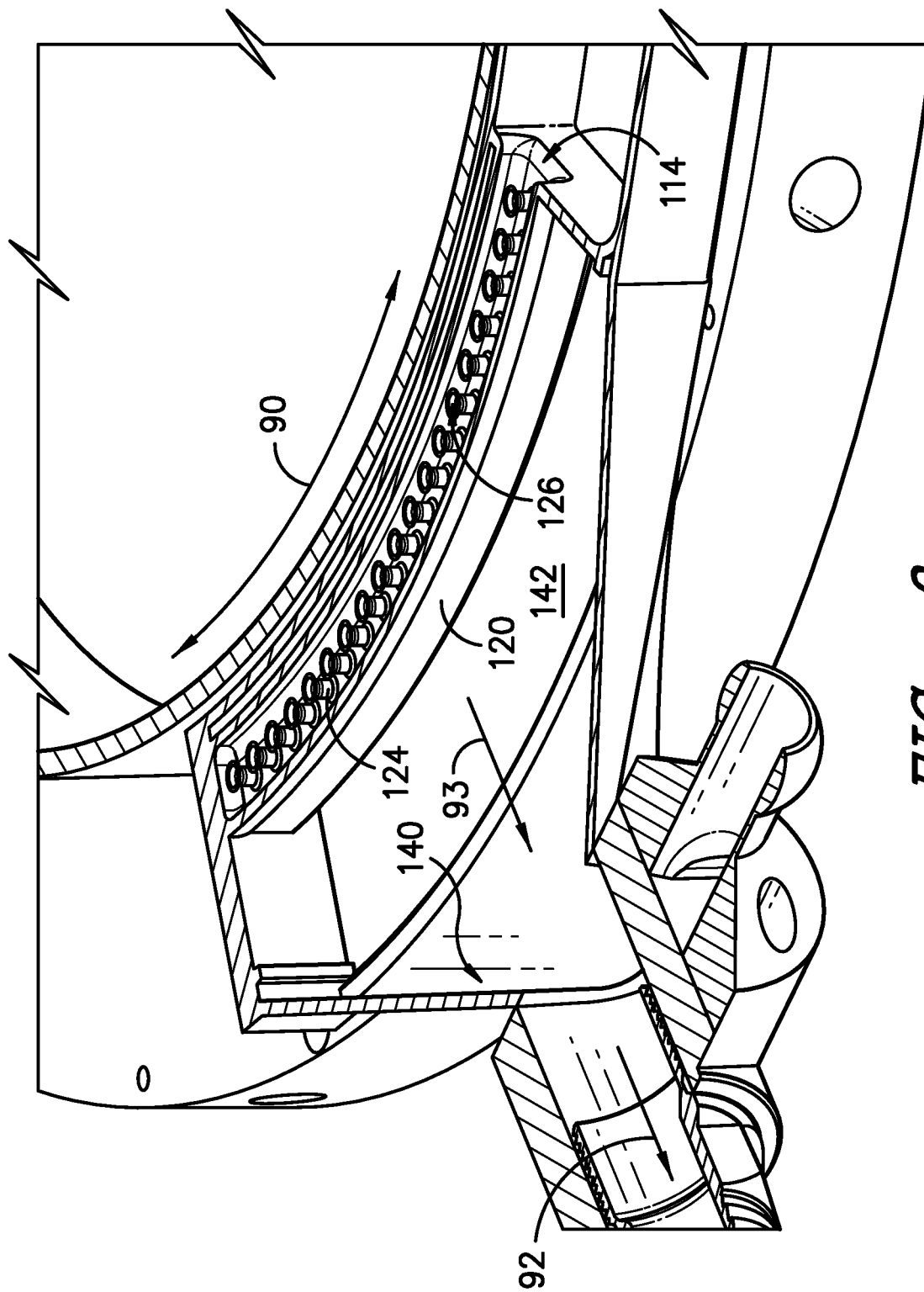
FIG. -8-

ADDITIVE MANUFACTURING APPARATUS AND FLUID FLOW MECHANISM

FIELD

The present disclosure generally relates to an additive manufacturing apparatus. More specifically, the present disclosure relates to a fluid flow mechanism for an additive manufacturing apparatus.

BACKGROUND

Additive manufacturing (AM) encompasses a variety of technologies for producing components in an additive, layer-wise fashion. In powder bed fusion, a focused energy beam is used to fuse powder particles together on a layer-wise basis. The energy beam may be either an electron beam or laser. Laser powder bed fusion processes are referred to in the industry by many different names, the most common of which being selective laser sintering (SLS) and selective laser melting (SLM), depending on the nature of the powder fusion process. When the powder to be fused is metal, the terms direct metal laser sintering (DMLS) and direct metal laser melting (DMLM) are commonly used.

Debris, soot, smoke, spatter, or other undesired particulate matter may form near the fused layer. Soot and smoke can attenuate the laser beam, which may result in decreased energy at the desired fuse area and defective fusing. Debris, spatter, or other particulate matter at the powder bed may partially fuse into the part, which may lead to porosity, defective fusion, or other defects.

As such, there is a need for structures and methods for mitigating or eliminating defects resulting from undesired particulate matter. Furthermore, there is a need for structures for removing undesired particulate matter from the additive manufacturing apparatus.

BRIEF DESCRIPTION

Aspects and advantages of the invention will be set forth in part in the following description, or may be obvious from the description, or may be learned through practice of the invention.

An additive manufacturing (AM) apparatus is provided, having a build unit including a powder delivery mechanism, a powder recoating mechanism, and an irradiation beam directing mechanism. The AM apparatus further includes a rotatable build platform having an inner diameter and an outer diameter. A fluid flow mechanism includes an inlet body forming an inlet plenum and a collector body extended from the inlet body. The collector body forms a collector plenum in fluid communication with the inlet plenum. The collector body forms an outlet opening, wherein the outlet opening is positioned proximate to the inner diameter of the rotatable build platform. The outlet opening is configured to provide a flow of fluid toward the outer diameter above the rotatable build platform.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic diagram showing a front view, cross section of an additive manufacturing apparatus according to an aspect of the present disclosure;

FIG. 2 is a perspective view of an additive manufacturing apparatus including a fluid flow mechanism according to aspects of the present disclosure;

FIGS. 3-6 are cutaway views of the additive manufacturing apparatus and fluid flow mechanism of FIG. 2:

FIG. 7 is an embodiment of the fluid flow mechanism according to an aspect of the present disclosure; and FIG. 8 is a cutaway perspective view of the additive manufacturing apparatus and fluid flow mechanism of FIG. 2.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first". "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure provides embodiments of an apparatus that may be used to perform powder-based additive layer manufacturing. Examples of powder-based additive layer manufacturing include but are not limited to selective laser sintering (SLS), selective laser melting (SLM), direct metal laser sintering (DMLS), direct metal laser melting (DMLM) and electron beam melting (EBM) processes.

An additive manufacturing apparatus provided herein includes a build unit assembly. The build unit assembly includes certain build components, including, a powder recoating mechanism and an irradiation beam directing mechanism. The build unit is attached to a positioning mechanism that allows two- or three-dimensional movement (along x-, y- and z-axes) throughout the build environment, as well as rotation of the build unit in a way that allows leveling of the powder in any direction desired. The positioning mechanism may be a gantry, a delta robot, a cable robot, a robotic arm, a belt drive, or other appropriate positioning mechanism.

Various embodiments of the additive manufacturing apparatus further include a rotating build platform, or any appropriate additive manufacturing machine where the scan head moves relative to the build platform. For example, the build platform may include an X, Y, Z gantry system where the processing area moves about the build platform. Particular embodiments of the build platform include a substantially circular configuration. However, it should be appreciated that other embodiments may include other shape configurations. In certain embodiments, the build unit of the apparatus is mobile, which may eliminate the need to lower the build platform as successive layers of powder are built up. In a still particular embodiments, the rotating build platform of the present disclosure is vertically stationary.

A fluid flow mechanism for an additive manufacturing apparatus provided herein allows for removing soot, spatter, smoke, or other undesired particulate matter generated by the fusing process to be removed from a build platform. In particular embodiments, the fluid flow mechanism provides a flow of an inert gas above the powder bed and pushes undesired particulate matter away from the build region. The fluid flow mechanism has a pressurized plenum and an outlet opening oriented from an inner dimension of the build platform, such as an inner diameter, to an outer dimension of the build platform, such as an outer diameter. The outlet opening, such as a slot extended co-directional to the surface of the build platform, provides a substantially laminar flow of inert gas from the pressure plenum to the build platform. As such, the flow of inert gas pushes the undesired particulate matter away from the build region or outside of the printed part. The fluid flow mechanism may mitigate or eliminate entrainment of undesired particulate matter onto the printed part, allowing for improved build quality and decreased waste.

FIG. 1 depicts a schematic representation of an additive manufacturing apparatus 200 of an embodiment of the present disclosure. The apparatus 200 may include a build enclosure 201 housing the entire apparatus 200 and object 230 to be built. The apparatus 200 includes a build unit 202 and a rotating build platform 210. During operation, the apparatus builds an object 230 in a powder bed 214 formed between one or both of an outer grown build envelope 224 or an inner build envelope 226. The object 230 may be a large annular object, such as, but not limited to, a turbine or vane shrouding, a central engine shaft, a casing, a compressor liner, a combustor liner, a duct, an array of smaller objects arranged onto the large build platform, etc.

The build unit 202 may be configured to include several components for additively manufacturing a high-precision, large-scale object or multiple smaller objects. A mobile build unit 202 includes a powder delivery mechanism, a powder recoating mechanism, a gas-flow mechanism with a gas-flow zone and an irradiation beam directing mechanism.

The build unit positioning mechanism 225 may be an X-Y-Z gantry that has one or more x-crossbeams 225X (one shown in FIG. 1) that independently move the build unit 202 along the x-axis (i.e. left or right), one or more y-crossbeams 225Y (one shown in FIG. 1) that respectively move the build unit 202 along the y-axis (i.e. inward or outward). Such two-dimensional movements across the x-y plane are substantially parallel to the build platform 210 or a build area therewithin. Additionally, the build unit positioning mechanism 225 has one or more z-crossbeams 225Z (two shown in FIG. 1) that moves the build unit 202 along the z-axis (i.e. upward and downward or substantially perpendicular to the build platform 210 or a build area therewithin). The build unit positioning mechanism 225 is further operable to rotate the build unit 202 around the c-axis and also the b-axis. The build unit positioning mechanism 225 may also be a robotic arm (not shown) or other suitable mechanism as desired.

The rotating build platform 210 may be a rigid, ring-shaped or annular structure (i.e. with an inner central hole) configured to rotate 360° around the center of rotation W, or the build platform may be a disk without a central hole. The rotating build platform 210 may be secured to an end mount of a motor 216 that is operable to selectively rotate the rotating build platform 210 around the center of rotation W such that the build platform 210 moves in a circular path. The motor 216 may be further secured to a stationary support structure 228. The motor may also be located elsewhere near the apparatus and mechanically connected with the build platform via a belt for translating motion of the motor to the build platform.

Referring now to FIG. 2, a perspective view of an additive manufacturing apparatus such as described in regard to FIG. 1 is provided. For the sake of clarity, details from the apparatus 200 in FIG. 1 are omitted in FIGS. 2-8. The additive manufacturing apparatus includes a fluid flow mechanism 100 configured to provide a flow of fluid, such as an inert gas, above the powder bed 214 (FIG. 1) at the build platform 210 and push undesired particulate matter away from the build region. Referring to FIG. 2 and the detailed cutaway views in FIGS. 3-8, the fluid flow mechanism 100 includes an inlet opening 102 through which a flow of fluid, depicted schematically via arrow 91, enters the fluid flow mechanism, and an egress opening 104 through which the flow of fluid egresses, as depicted schematically via arrow 92.

The inlet opening 102 is formed at an inlet body 110, such as depicted in FIGS. 2-4. Referring to the cutaway view in FIG. 3, the inlet body 110 forms an inlet plenum 112 therewithin. In a particular embodiment such as depicted, the inlet body 110 is extended substantially along the z-axis. A collector body 120 is extended from the inlet body 110. In a particular embodiment such as depicted in FIGS. 2-4 and FIG. 8, the collector body 120 is extended along an arc 90 (FIG. 8) corresponding to annular extension of the build platform 210. In a still particular embodiment, a portion of the collector body 120 and the inlet body 110 are in a substantially 90 degree relationship to one another. In other embodiments, the collector body 120 and the inlet plenum 112 are between 75 degrees and 105 degrees relationship to one another, or between 80 degrees and 100 degrees relationship to one another, or between 85 degrees and 95 degrees relationship to one another, or between 97 degrees and 93 degrees relationship to one another, or between 89 degrees and 91 degrees relationship to one another, or any combination thereof particular embodiments of the angular relationship between the collector body and the inlet plenum may allow for more compact flow devices and additive manufacturing apparatuses. Improved compactness may allow for decreased apparatus weight while providing one or more other benefits such as described herein.

Referring now to FIGS. 3-8, the collector body 120 forms a collector plenum 122 therewithin. The collector plenum opening 114 is formed through the inlet body 110 to provide fluid communication from the inlet plenum 112 to the collector plenum 122. In various embodiments, a collector outlet passage 124 is formed at the collector body 120. Referring to the detailed views in FIGS. 5-7, the collector outlet passage 124 is extended substantially along the z-axis toward the build platform 210. In one embodiment, such as depicted in FIG. 5 and further provided in the detailed cutaway view in FIG. 6, the collector body 120 forms a plurality of discrete collector outlet passages 124. Each collector outlet passage 124 is positioned in adjacent arrangement along the arc 90 of the collector body 120, such as depicted in FIG. 8. In another embodiment, such as depicted in FIG. 7, the collector outlet passage 124 is a slot extended along the arc of the collector body 120. In various embodiments, such as depicted in FIG. 6 and FIG. 7, the collector passage 124 may include a converging cross-sectional area, such as depicted at a collector passage inlet 126. The converging cross-sectional area is configured to reduce or mitigate pressure losses or flow losses and feed the fluid from the collector plenum 122 through the collector passage 124.

Referring still to the detailed cutaway views in FIGS. 6-7, the collector body 120 further forms an outlet plenum 132 in fluid communication with the collector passage 124. In various embodiments, the outlet plenum 132 is formed between the collector passage 124 and the build platform 210 along the z-axis. In a particular embodiment, the outlet plenum 132 is formed at least in part by a plenum wall 134 extended along a radial direction R relative to the center of rotation W (FIG. 1).

In a still particular embodiment, the plenum wall 134 diverges from a collector passage outlet 128 to an outlet opening 136 at the outlet plenum 132. Still particularly, the outlet opening 136 is positioned distal to the collector passage outlet 128 relative to the extension of the plenum wall 134 along the radial direction R. The diverging plenum wall 134 provides for an increasing cross-sectional area of the outlet plenum 132 from the collector passage outlet 128 to the outlet opening 136.

Referring still to FIGS. 5-7, the outlet opening 136 is positioned at an inner diameter 211 of the build platform 210. A second plenum wall 138 is extended along the z-axis at the distal end of the collector body 120 relative to the collector passage outlet 128. The second plenum wall 138 may generally form a fairing or curved wall configured to direct the flow of fluid through the outlet opening 136 toward an outer diameter 212 of the build platform 210. Together, the first plenum wall 134 and the second plenum wall 138 may provide a toroidal profile to direct the fluid within the outlet plenum 132 in the direction of the inner diameter 211 before directing the fluid out of the outlet opening 136 toward the outer diameter 212, such as depicted schematically via arrow 93 (FIG. 8). Still further, in particular embodiments, the outlet opening 136 forms a slot extended along the arc 90 (FIG. 8) of the collector body 120. In other embodiments, the outlet opening 136 may include a plurality of discrete outlet openings in adjacent arrangement along the arc of the collector body.

Referring back to the perspective view in FIG. 2, and further depicted in the cutaway views in FIG. 4, FIG. 5, and FIG. 8, an outlet cavity 142 is formed by an outlet body 140. The flow of fluid 93 is received from the outlet opening 136 into the outlet cavity 142. The outlet body 140 forms the egress opening 104 through which the flow of fluid 92 is removed from the fluid flow mechanism 100. In another embodiment, a second fluid flow mechanism may be coupled directly to the outlet cavity 142 and configured to provide a flow of fluid, such as inert gas, directly to the build platform 210.

The inlet body 110 is connected to a positive displacement pump 300 (FIG. 2) or other mechanism for providing a positive pressure flow of fluid to the inlet plenum 112. The outlet body 140 is connected to a vacuum pump 400 (FIG. 2) or other appropriate device for scavenging the flow of fluid from the outlet cavity 142. During operation of the apparatus 200 and fluid flow mechanism 100, the flow of fluid 91, such as inert gas, is provided in positive pressure displacement through the inlet plenum 112 and the collector plenum 122. The collector plenum 122 may generally normalize the flow or pressure of the fluid before egressing the fluid through the collector passage outlet 128 to the outlet plenum 132. The plenum walls 134, 138, such as configured in toroidal profile, may provide a substantially uniform sheet of laminar flow of fluid from the outlet opening 136 from the inner diameter 211 toward the outer diameter 212 of the build platform 210.

The fluid flow mechanism allows for a diverging flow field of the flow of fluid pushing undesired particulate matter from the build platform. The diverging flow field provides unexpected benefits for removing undesired particulate matter, at least in part since diverging flow fields are generally more difficult to control fluid physical conditions (e.g., temperature, pressure, flow rate, etc.), while conventional additive manufacturing apparatuses may generally desire constant flow fields. The flow of fluid provided above the powder bed at the build platform 210 pushes undesired particulate matter away from the build region, such as toward the outer diameter 212 of the build platform. The fluid flow mechanism has a pressurized plenum and an outlet opening oriented from an inner dimension of the build platform, such as an inner diameter, to an outer dimension of the build platform, such as an outer diameter. The outlet opening 136, such as a slot extended co-directional to the surface of the build platform 210, may provide a substantially laminar flow of fluid from the outlet plenum 132 to the build platform 210. As such, the flow of fluid 93 pushes the undesired particulate matter away from the build region or outside of the printed part.

Representative examples of suitable powder materials for embodiments of the apparatus depicted and described herein may include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. An additive manufacturing apparatus including a build unit including a powder delivery mechanism, a powder recoating mechanism, and an irradiation beam directing mechanism; a rotatable build platform having an inner diameter and an outer diameter; and a fluid flow mechanism, wherein the fluid flow mechanism includes an inlet body forming an inlet plenum and a collector body extended from the inlet body, wherein the collector body forms a collector plenum in fluid communication with the inlet plenum, and wherein the collector body forms an outlet opening, wherein the outlet opening is positioned proximate to the inner diameter of the rotatable build platform, and wherein the outlet opening is configured to provide a flow of fluid toward the outer diameter above the rotatable build platform.

2. The apparatus of any one or more clauses herein, wherein the collector body comprises a plenum wall forming the outlet opening.

3. The apparatus of any one or more clauses herein, wherein the collector body is extended along an arc corresponding to the build platform.

4. The apparatus of any one or more clauses herein, wherein the outlet opening is a slot extended along the arc of the collector body.

5. The apparatus of any one or more clauses herein, wherein the collector body forms a collector passage extended between the collector plenum and an outlet plenum at which the outlet opening is defined.

6. The apparatus of any one or more clauses herein, wherein the collector passage is extended along a z-axis, and wherein the outlet plenum is positioned between the build platform and the collector plenum along the z-axis.

7. The apparatus of any one or more clauses herein, wherein the collector passage is a plurality of discrete collector passages in adjacent arrangement along an arc corresponding to the build platform.

8. The apparatus of any one or more clauses herein, wherein the collector passage is a slot extended along an arc corresponding to the build platform.

9. The apparatus of any one or more clauses herein, wherein the inlet body and the collector body are positioned in substantially 90 degree arrangement to one another.

10. The apparatus of any one or more clauses herein, wherein the collector body includes a first plenum wall diverging from a collector passage outlet to the outlet opening.

11. The apparatus of any one or more clauses herein, wherein the first plenum wall provides an increasing cross-sectional area of an outlet plenum at which the outlet opening is defined, wherein the increasing cross-sectional area is from the collector passage outlet to the outlet opening.

12. The apparatus of any one or more clauses herein, wherein the collector body includes a second plenum wall, wherein the first plenum wall and the second plenum wall together form a toroidal profile to direct a flow of fluid within the outlet plenum from the inner diameter of the build platform toward the outer diameter of the build platform.

13. The apparatus of any one or more clauses herein, wherein a plenum wall is configured to form the outlet opening to provide a substantially laminar flow of fluid toward the outer diameter above the rotatable build platform.

14. The apparatus of any one or more clauses herein, wherein the flow of fluid is an inert gas.

15. The apparatus of any one or more clauses herein, the fluid flow mechanism including an outlet body forming an outlet cavity configured to receive the flow of fluid from the outlet opening of the collector body.

16. The apparatus of any one or more clauses herein, the apparatus including a positive displacement pump configured to provide a positive pressure flow of fluid to the inlet plenum, and a vacuum pump configured to scavenge the flow of fluid from the outlet cavity.

17. The apparatus of any one or more clauses herein, wherein the build platform is in a substantially circular configuration.

18. The apparatus of any one or more clauses herein, wherein the collector body forms a collector passage extended from the collector plenum to an outlet plenum, wherein the collector passage forms a converging cross-sectional area from the collector plenum toward the outlet plenum.

19. The apparatus of any one or more clauses herein, wherein the collector passage forms a collector passage outlet distal to the inner diameter of the build platform.

20. The apparatus of any one or more clauses herein, wherein the collector body includes a plenum wall forming the outlet plenum, and wherein the plenum wall forms the outlet opening proximate to the inner diameter of the build platform.

What is claimed is:

1. An additive manufacturing apparatus, comprising:
    a build unit comprising:
        a powder delivery mechanism;
        a powder recoating mechanism; and
        an irradiation beam directing mechanism;
    a rotatable build platform having a surface to receive a powder bed, the rotatable build platform having an inner diameter and an outer diameter; and
    a fluid flow mechanism, comprising:
        an inlet body forming an inlet plenum; and
        a collector body extended from the inlet body, wherein the collector body forms:
            a collector plenum in fluid communication with the inlet plenum; and
            an outlet opening, wherein the outlet opening is positioned above the powder bed proximate to the inner diameter of the rotatable build platform and extends co-directional to the surface of the rotatable build platform, and wherein the outlet opening is structurally formed by the collector body to discharge a flow of fluid toward the outer diameter above the rotatable build platform in a predominately radially outward direction upon exiting the outlet opening.

2. The apparatus of claim 1, wherein the collector body comprises a plenum wall forming the outlet opening.

3. The apparatus of claim 1, wherein the collector body is extended along an arc corresponding to the build platform.

4. The apparatus of claim 3, wherein the outlet opening is a slot extended along the arc of the collector body.

5. The apparatus of claim 1, wherein the collector body forms a collector passage extended between the collector plenum and an outlet plenum at which the outlet opening is defined.

6. The apparatus of claim 5, wherein the collector passage is extended along a z-axis, and wherein the outlet plenum is positioned between the build platform and the collector plenum along the z-axis.

7. The apparatus of claim 5, wherein the collector passage is a plurality of discrete collector passages in adjacent arrangement along an arc corresponding to the build platform.

8. The apparatus of claim 5, wherein the collector passage is a slot extended along an arc corresponding to the build platform.

9. The apparatus of claim 1, wherein the collector body comprises a first plenum wall diverging from a collector passage outlet to the outlet opening.

10. The apparatus of claim 9, wherein the first plenum wall provides an increasing cross-sectional area of an outlet plenum at which the outlet opening is defined, wherein the increasing cross-sectional area is from the collector passage outlet to the outlet opening.

11. The apparatus of claim 9, wherein the collector body comprises a second plenum wall, wherein the first plenum wall and the second plenum wall together form a toroidal profile to direct a flow of fluid within an outlet plenum from the inner diameter of the build platform toward the outer diameter of the build platform.

12. The apparatus of claim 1, wherein a plenum wall forms the outlet opening to provide a substantially laminar flow of fluid toward the outer diameter above the rotatable build platform.

13. The apparatus of claim 12, wherein the flow of fluid is an inert gas.

14. The apparatus of claim 1, the fluid flow mechanism comprising:
   an outlet body forming an outlet cavity configured to receive the flow of fluid from the outlet opening of the collector body.

15. The apparatus of claim 14, the apparatus comprising:
   a positive displacement pump configured to provide a positive pressure flow of fluid to the inlet plenum; and
   a vacuum pump configured to scavenge the flow of fluid from the outlet cavity.

16. The apparatus of claim 1, wherein the collector body forms a collector passage extended from the collector plenum to an outlet plenum, wherein the collector passage forms a converging cross-sectional area from the collector plenum toward the outlet plenum.

17. The apparatus of claim 16, wherein the collector passage forms a collector passage outlet distal to the inner diameter of the build platform.

18. The apparatus of claim 17, wherein the collector body comprises a plenum wall forming the outlet plenum, and wherein the plenum wall forms the outlet opening proximate to the inner diameter of the build platform.

19. The apparatus of claim 14, wherein the outlet opening and the outlet cavity are between the powder bed and the build unit.

20. An additive manufacturing apparatus, comprising:
   a build unit comprising:
      a powder delivery mechanism; and
      an irradiation beam directing mechanism;
   a build platform rotatable about an axis of rotation, wherein a powder bed is between the build platform and the build unit, and wherein the powder bed includes a bottom surface proximate the build platform and a top surface opposite the bottom surface where the top surface defines an upper extent of the powder bed; and
   a fluid flow mechanism, comprising a collector body between the build unit and the powder bed, the collector body comprising an outlet opening above the top surface of the powder bed and extending co-directional to the top surface, the outlet opening configured to direct a fluid in a radial direction with respect to the axis of rotation to create a fluid momentum above the powder bed to push undesired particulate matter away in the radial direction.

\* \* \* \* \*